United States Patent [19]

Neiss et al.

[11] Patent Number: 5,662,315
[45] Date of Patent: Sep. 2, 1997

[54] BUMPER HOLDER

[75] Inventors: Lynn R. Neiss, Navarre, Ohio; Vinny J. Liotta, Charlotte, N.C.

[73] Assignee: Brut Manufacturing Company, Navarre, Ohio

[21] Appl. No.: 643,616

[22] Filed: May 6, 1996

[51] Int. Cl.⁶ .................................................. B23Q 3/00
[52] U.S. Cl. .................. 269/17; 269/289 R; 269/285; 254/134
[58] Field of Search ............................ 254/8 B, DIG. 4, 254/133 R, 134; 269/17, 71, 265, 273, 285, 286, 296, 299, 905, 909

[56] References Cited

U.S. PATENT DOCUMENTS

| | | | |
|---|---|---|---|
| 2,669,422 | 2/1954 | Branick | 254/134 |
| 2,872,690 | 3/1959 | Brown | 269/71 |
| 2,882,012 | 4/1959 | Luna | 254/133 R |
| 3,028,145 | 4/1962 | Brand | 254/134 |
| 4,042,208 | 8/1977 | Arakaki | 254/8 B |
| 4,183,511 | 1/1980 | Marek | 269/17 |

Primary Examiner—Timothy V. Eley
Assistant Examiner—Lee Wilson
Attorney, Agent, or Firm—Renner, Kenner, Greive, Bobak, Taylor & Weber

[57] ABSTRACT

A bumper holder for securely supporting an automobile bumper includes a movable carriage and an adjustable cradle that has indexable arms with slidable brackets attached thereto. The adjustable cradle is configurable into a collapsed storage position and an expanded holding position adaptable to receive various sizes and configurations of automobile bumpers. The movable carriage includes a handle and a tubular support column which slidably receives a telescopic shaft on which the indexable arms and slidable brackets are supported. The indexable arms and slidable brackets are movable into any desired position to securely hold a bumper during a repair and finishing process. The indexable arms also have a bracket aperture for receiving a slidable cross bracket that is substantially perpendicular to the slidable brackets.

19 Claims, 3 Drawing Sheets

BUMPER HOLDER

TECHNICAL FIELD

The invention herein resides generally in the art of devices for securely holding a work piece. More particularly, the present invention relates to a bumper holder for holding detached automobile bumpers. Specifically, the present invention relates to a bumper holder, which has a collapsed storage position and an expanded holding position, that is capable of positioning the bumper in various work positions.

BACKGROUND ART

Currently, in automobile body shops when a damaged automobile bumper requires repair, the bumper is detached from the automobile and then placed on a floor or workbench where the necessary repairs are made. Most new model automobiles employ bumpers manufactured from polymeric materials such as urethane, rubber and the like. These bumpers tend to wobble or deflect if not secured along their entire length which causes the repair work to be quite time consuming. Additionally, the unsecured bumpers tend to roll over if slightly jostled causing damage to any repair work already completed.

In particular, when repairing a damaged automobile bumper, the bumper is first detached from the automobile and washed to remove dirt, grime and any mold release residue. Afterwards, the back side or the side attached to the automobile is patched in a manner well known in the art. After the patching material has cured, the front side or exterior surface of the bumper is repaired and the bumper is transferred to a painting work station. After painting, the bumper is then taken to an oven room for curing the paint onto the bumper. Other work that may be required includes sanding, polishing and the like.

Current methods of holding and moving a damaged automobile bumper from one work station or work position to another are severely deficient. If a bumper is manually transferred from one work position or work station to another, the bumper is likely to wobble or twist and damage the repair work completed. It is also difficult to make repairs if the bumper shifts or moves as the work is being performed. This causes unneeded delay in completing the repair of the bumper. Although holding devices are available, none are known to be adjustable to accommodate the various different shapes and sizes of automobile bumpers currently available. Nor do any of these known mechanical holding devices provide a configuration which is easily stored after use.

Based upon the foregoing, it is evident that there is a need for a bumper holder that has a collapsed storage position and an expanded holding position. Furthermore, there is also a need for a bumper holder with an expanded holding position that is adjustable to accommodate various sizes of bumpers and that can accommodate the bumper in various work positions. Moreover, there is also a need for a bumper holder that is easily transferrable between work stations.

DISCLOSURE OF INVENTION

In light of the foregoing, it is a first aspect of the present invention to provide a bumper holder.

Another aspect of the present invention is to provide a bumper holder that has a collapsed storage position and an expanded holding position.

Still a further aspect of the present invention, as set forth above, is to provide a bumper holder that is capable of securely holding various sizes of bumpers in various work positions.

Still another aspect of the present invention, as set forth above, is to provide a bumper holder that allows for repair work such as prepping, patching, sanding, painting, polishing or any other work required to be performed on a bumper.

An additional aspect of the present invention as set forth above, is to provide a bumper holder wherein a handle and a plurality of wheels are attached to the bumper holder to allow transfer of the bumper holder between various work stations.

Yet another aspect of the present invention, as set forth above, is to provide a bumper holder which has a telescopic shaft that is movable within a tubular support column to adjust the height of the bumper holder.

Yet a further aspect of the present invention, as set forth above, is to provide a bumper holder which has a pair of arms indexable between various positions and wherein each arm is movable to various positions.

Still another aspect of the present invention, as set forth above, is to provide a bumper holder which has a pair of brackets connected to each arm and wherein each bracket is movable and rotatable into various bumper holding positions.

Still yet another aspect of the present invention, as set forth above, is to provide a bumper holder which has a cross bracket received within each arm wherein each crossbracket is extendable and rotatable into various bumper holding positions and wherein each cross bracket is substantially perpendicular to the pairs of brackets.

Still a further aspect of the present invention is to provide a bumper holder, as set forth above, which reduces the mount of time required to repair a damaged bumper.

The foregoing and other aspects of the invention which shall become apparent as the detailed description proceeds, are achieved by a collapsible bumper holder, comprising: a carriage; and a cradle carried by the carriage, the cradle movable between a collapsed storage position and an expanded holding position adaptable to receive a bumper.

The present invention also provides an apparatus for holding bumpers, comprising: a carriage; a shaft extending upwardly from the carriage; a first sleeve connected to the shaft; a pair of arms slidably received within the first sleeve; and means for adjusting the position of each arm within the first sleeve, the pair of arms movable to hold various sizes of bumpers.

The present invention also provides a bumper holder, comprising: a carriage having a base, a tubular support column extending upwardly from the base, and an adjustment knob connected to the tubular support column; and a cradle having a telescopic shaft slidably received within the tubular support column and positionally secured therein by the adjustment knob, a sleeve connected to the telescopic shaft and slidably receiving a pair of arms which are positionally secured therein by a pair of arm adjustment knobs, the pair of arms movable to hold a bumper in a desired position.

BRIEF DESCRIPTION OF THE DRAWINGS

For a complete understanding of the objects, techniques and structure of the invention, reference should be made to the following detailed description and accompanying drawings wherein.

BEST MODE FOR CARRYING OUT THE INVENTION

Figure 1:
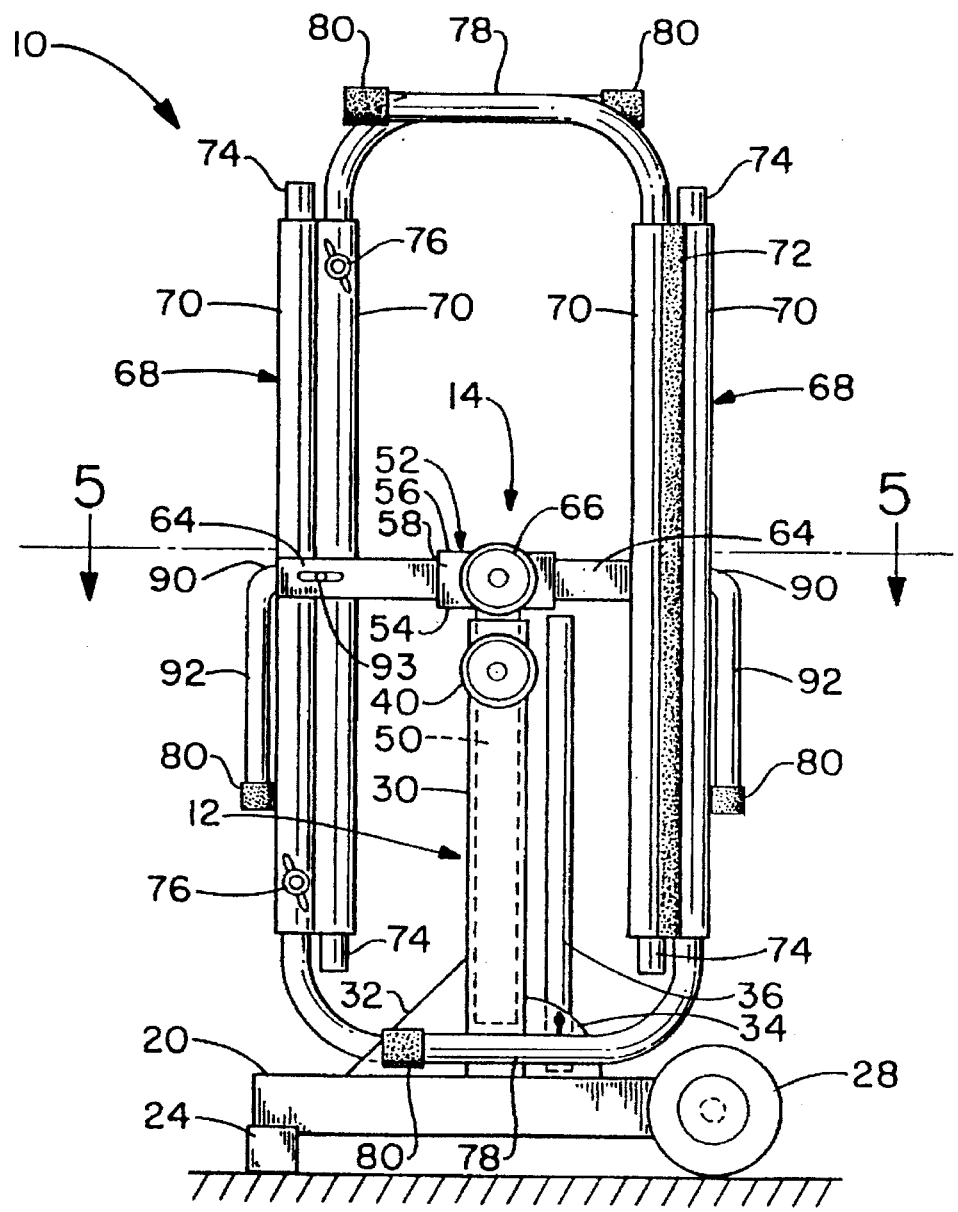
FIG. 1 is a side elevational view of a bumper holder in a storage position.
Figure 3:
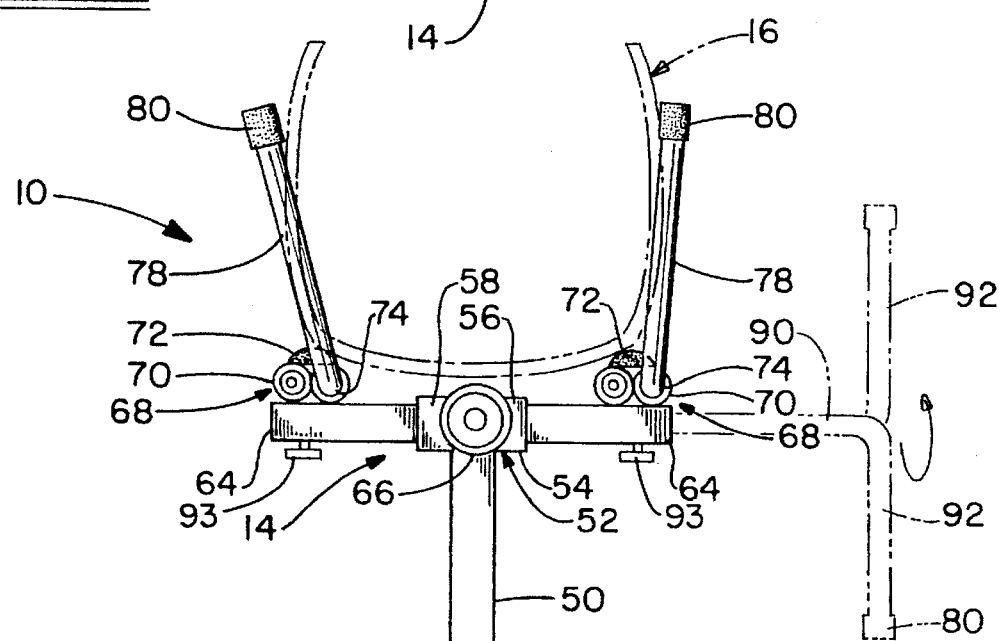
FIG. 3 is a side elevational view similar to FIG. 1, but showing the bumper holder in a first operative position.
Figure 4:
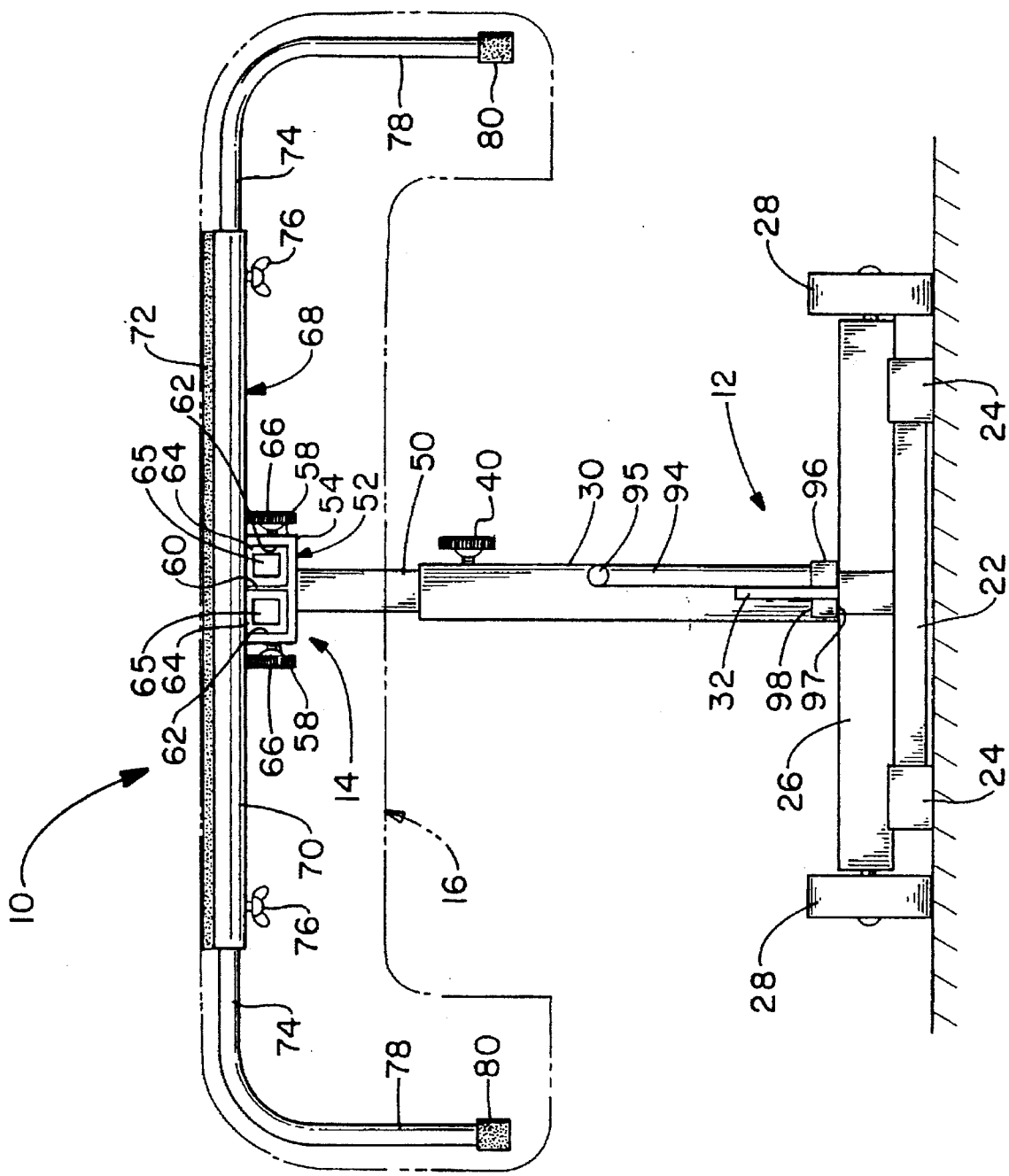
FIG. 4 is a front elevational view showing the bumper holder in a second operative position.

Referring now to all the drawings, it can be seen that a bumper holder according to the present invention is designated generally by the numeral 10. The bumper holder 10 includes a carriage 12 that supports or carries a cradle 14. As seen in FIG. 1, the cradle 14 is carried by the carriage 12 in a collapsed storage position that minimizes the amount of storage space required to store the bumper holder 10. When in use, as seen in FIGS. 3 and 4, the cradle 14 is expandable into various holding positions adaptable to receive a bumper 16. As will be discussed in detail hereinbelow, the cradle 14 and carriage 12 are made of steel or other rigid materials to allow the secure support of the bumper 16 as it is worked upon.

As best seen in FIGS. 1, 3 and 4, the carriage 12 includes a base 20 which has a pair of opposed ends. A transverse beam 22 is attached by welding or other similar means to one of the opposed ends of the base 20 and is centered with respect thereto. An end cap 24 is attached to each end of the transverse beam 22 to prevent damage thereto. Those skilled in the art will appreciate that the end caps 24 are made of a polymeric non-skid material which prevent the bumper holder 10 from being easily jostled. An axle 26 is attached by welding or other similar means to the other opposed end of base 20 and centered with respect thereto. A wheel 28 is rotatably connected to each end of the axle 26 to allow for the transfer of the carriage 12 from one work station to another. Typically, the axle 26 is of sufficient length to provide stability when transporting the bumper holder 10. It will be appreciated that other wheeled configurations could be connected to the carriage 12 to allow for transfer of the bumper holder 10.

A tubular support column 30 extends upwardly from the base 20 and receives the cradle 14. A gusset 32 interconnects the bottom of the tubular support column 30 to the base 20 to provide strength and stability to the carriage 12. The gusset 32 forms a triangular opening 33 between the base 20 and the tubular support column 30. A plate 34 also interconnects the bottom of the tubular support column 30 to the base 20 and is disposed on the side opposite the gusset 32. The plate 34 has a plurality of position holes 35.

A handle 36, which usually has a hand grip, is attached to the plate 34 by a pivot pin 38 and an insert pin 39. The pivot pin 38 pivotably interconnects the handle 36 to the carriage 12 in such a manner that the handle 36 is movable from an upright storage position, as shown in FIG. 1, to an angular mobile position as shown in FIG. 3. In other words, when the bumper holder 10 is placed in storage, the insert pin 39 secures the handle 36 in one of the position holes 35 in a position substantially parallel to the tubular support column 30. When moving the bumper holder 10, the insert pin 39 is removed, the handle 36 is rotated at the pivot pin 38, and upon reinsertion of the insert pin 39 into the appropriate position hole 35, the carriage 12 is placed in a mobile position. Those skilled in the art will appreciate that to move the bumper holder 10, the handle 36 is pushed downwardly to lift the transverse beam 22 from contact with the floor and the handle 36 is pulled to rotate the wheels 28. Upon arrival at a new work station, the handle 36 is released and the transverse beam 22 returns to contact with the floor. If desired, the handle 36 can be returned to its storage position or left in its mobile position. It will be appreciated that other handle configurations could be connected to the carriage 12.

An adjustment knob 40 is disposed at the top of the tubular support column 30 to allow positional adjustment of the height of the cradle 14 as needed by the person making repairs to the bumper 16. Those skilled in the art will appreciate that the adjustment knob 40 is loosened to allow movement of the cradle 14 and then tightened to Secure the cradle to the tubular support column 30.

Figure 2:
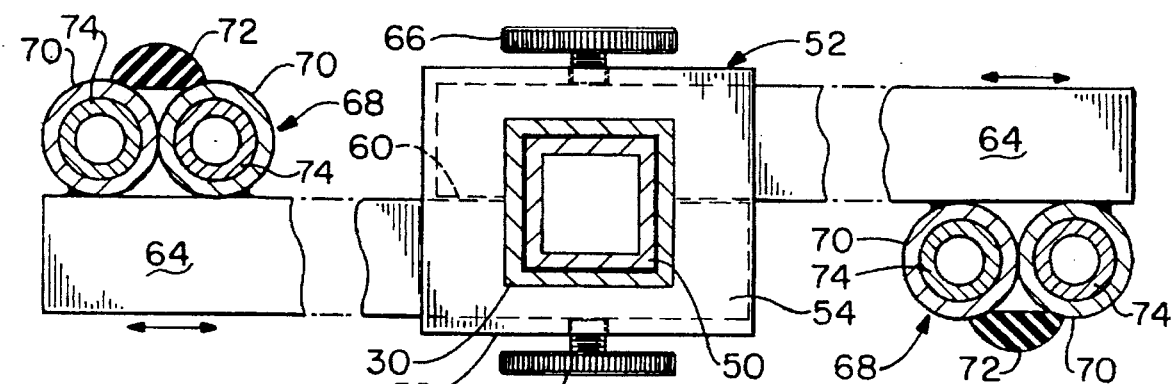
FIG. 2 is a cross-sectional view through the lower elements of the bumper holder without showing the cross-brackets.

The cradle 14 includes a telescopic shaft 50 that is slidably received in the tubular support column 30 and which is held in place by the adjustment knob 40. The adjustment knob 40 functions as a set screw to hold the telescopic shaft 50 against the interior of the tubular support column 30. Other means, such as where both the telescopic shaft 50 and the tubular support column 30 have alignment holes that receive a pin, could be employed to adjust the height of the cradle 14. As best seen in FIG. 2, both the telescopic shaft 50 and the tubular support column 36 are substantially rectangular in shape to prevent rotation therebetween. This stabilizes the bumper 16 during movement of the bumper 16 holder 10.

A sleeve 52 is connected to the top of the telescopic shaft 50. The sleeve 52 includes a bottom member 54, which is connected to the telescopic shaft 50 and a top member 56. The bottom member 54 and the top member 56 are interconnected on each lateral edge thereof by a pair of opposed sidewalls 58. Disposed between the opposed sidewalls 58 and interconnecting the bottom member 54 and the top member 56 is a center wall 60. The opposed side walls 58 and the center wall 60 define therebetween a pair of apertures 62 which are substantially rectangular in shape. Received within each aperture 62 is an arm 64 which is held in place by an arm adjustment knob 66. Each arm 64 has a bracket opening 65. As seen in FIG. 4, the adjustment knobs 66 secure their respective arms 64 against the center wall 60. Of course other means could be employed to hold the arms 64 in a desired position. It will be appreciated that due to the rectangular shape of the arm 64 and the aperture 62 in which it is received, each arm 64 can be completely withdrawn and reinserted in about 90° increments. This indexable feature of the bumper holder 10 allows conversion of the cradle 14 from the collapsed storage position to the expanded holding position. Those skilled in the art will appreciate that the arm 64 and the aperture 62 could employ other corresponding shapes such as a hexagon to obtain different angular increments.

As best seen in FIGS. 2 and 4, a sleeve 68 is connected to one end of each arm 64 by welding or other appropriate means. The approximate mid-point of the sleeve 68 is connected to its respective arm 64 and is substantially perpendicular thereto. The sleeve 68 includes a pair of tubes 70, wherein each tube is connected side by side in a "FIG. 8" configuration. A cushion 72 may be disposed on the side of the sleeve 68 opposite the arm 64 and between the tubes 70 to prevent the bumper 16 from coming in direct contact with the sleeve 68. The cushion 72, which is typically a foamed polymeric material or the like, prevents the bumper 16 from being scratched or damaged as it is placed on the cradle 14. Slidably and rotatably received within each tube 70 is a bracket 74. Each sleeve 68 has a pair of wing nuts 76 to positionally locate each bracket 74 within its respective tube 70. The wing nuts 76 are located on the side of the sleeve 68 opposite the cushion 72. Each wing nut 76 is associated with one end of the tube 70 opposite the location of the wing nut of the adjacent tube. An extension 78 angularly extends from the bracket 74 and, in the preferred embodiment, at about a 90° angle. An end cap 80 is disposed at each end of the extension 78 to protect the bumper 16 from any scratches as it is placed on or removed from the cradle 14.

Figure 5:
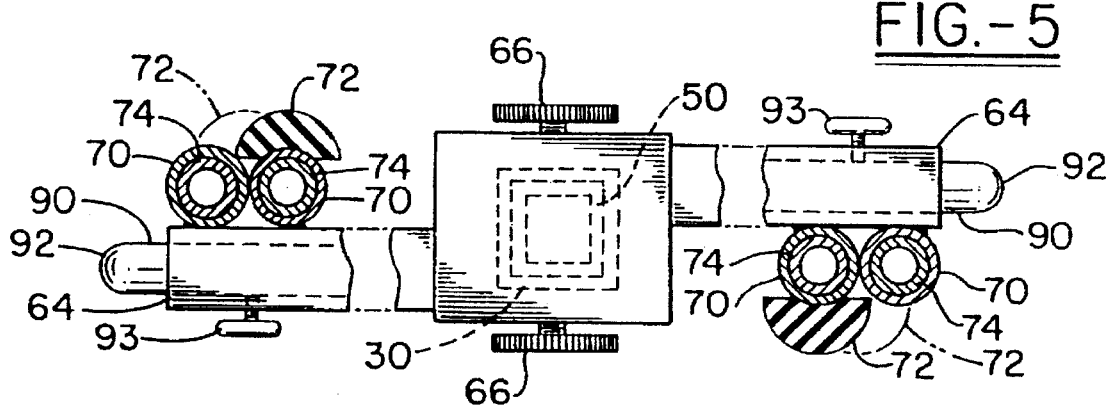
FIG. 5 is a cross-sectional view as taken along lines 5—5 of FIG. 1

In instances where additional support is required for a work piece, the bumper holder 10 may include a pair of cross brackets 90 as shown in FIGS. 3 and 5, each of which is received in the appropriate bracket opening 65. Each cross bracket 90 has an extension 92 that is at about a 90° angle thereto. End caps 80 are disposed on each end of the extensions 92. A bracket adjustment knob 93 is received in each arm 64 at the side opposite the sleeve 68. As with the other adjustment knobs, the adjustment knob 93 secures the cross bracket 90, which in this embodiment is of tubular construction, in the arm 64 in a desired position. It will also be appreciated that the cushion 72 may be positioned only on one of the tubes 70.

As best seen in FIG. 1, the bumper holder 10 is provided in a collapsed storage position. In the collapsed storage position, the handle 36 is stored in an upright position that is substantially perpendicular with the base 20. The telescopic shaft 50 is received within the tubular support column 30 and is positioned such that the bottom member 54 is positioned as close as possible to the top of the tubular support column 30. As seen in FIG. 4, each arm 64 is received within its appropriate aperture 62 and oriented such that the sleeves 68 are vertically positioned with respect to the floor. In other words, the sleeves 68 are in a substantially parallel relationship with the tubular support column 30. Moreover, each bracket 74 is slidably positioned within each tube 70 such that the wing span between each extension 78 is minimized. In other words, the brackets 74 are positioned within their respective tubes 70 to present the shortest possible distance between each extension 78. Additionally, each bracket 74 is oriented inwardly toward the tubular support column 30 to minimize the storage profile of the bumper holder 10. The cross brackets 90 are fully inserted within their respective arms 64 and are vertically positioned with respect to the floor. Of course, all adjustment devices 40, 66, 76 and 93 are tightened to prevent the corresponding secured item from falling out of the bumper holder 10 while in storage.

In order to transform the bumper holder 10 from its collapsed storage position to its expanded holding position, as seen in FIGS. 3 and 4, the repairman or user first withdraws the insert pin 39 from the plate 34 and reorients the handle 36 to an angular position. Accordingly, the insert pin 39 is re-inserted into the plate 34 and the handle 36 is securely held in place. The user then pushes the handle 36 downwardly to lift the transverse beam 22 from the floor and transfers the carriage 12 to the appropriate work station. The user then removes the downward pressure on the handle 36 to allow the transverse beam 22 to return to the work floor. The user then loosens the adjustment knob 40 and lifts the sleeve 52 and the attached telescopic shaft 50 upwardly to the desired position, whereupon the adjustment knob 40 is tightened. The user then loosens each arm adjustment knob 66 and completely withdraws the corresponding arm 64 from the appropriate aperture 62. Each arm 64 is rotated about 90° and reinserted into the appropriate aperture 62, whereupon the arm adjustment knob 66 is tightened. The user loosens the wing nuts 76 and then moves and rotates the brackets 74 to obtain the desired wing span of the angular extensions 78 to receive the damaged bumper. The wing nuts 76 are then tightened to hold the brackets 74 in place and the bumper 16 is placed upon the cushions 72. Those skilled in the art will appreciate that the wing nuts 76 and the adjustment knobs 66 may be loosened and re-tightened as needed to properly secure the bumper 16 within the cradle 14.

As seen in FIG. 3, the brackets 74 are rotated upwardly to present a U-shaped trough to hold the bumper 16. This position allows the user to perform work on the interior surface of the bumper 16. Each arm 64 can be re-positioned to narrow or widen the cradle 14 depending upon the width of the bumper 16. Likewise, each bracket 74 can be re-positioned to lengthen or shorten the cradle 14 depending upon the length of the bumper 16. It will also be appreciated that the sleeves 68 are now horizontally positioned with respect to the floor. In other words, the sleeves 68 are in a substantially perpendicular relationship with the tubular support column 30.

After all the necessary repair work is performed on the interior surface or attachment side of the bumper 16, the bumper is lifted off of the cradle 14 and the cradle 14 is repositioned so that the exterior surface of the bumper can be repaired. In particular, the wing nuts 76 are loosened and the brackets 74 are rotated downwardly and their appropriate wingspan is adjusted as best seen in FIG. 4. Accordingly, the bumper 16 is repositioned upon the sleeves 68 and the appropriate adjustment mechanisms are secured. Upon completion of the repair work, the user transfers the carriage 12 by pushing down on the handle 36 as described previously and moving the bumper holder 10 and bumper 16 to a paint room or other appropriate work station.

If the bumper 16 or other work piece requires additional support, the adjustment knob 93 is loosened and the cross brackets 90 are positionally adjusted to hold the work piece. When the desired expanded position is obtained, the adjustment knobs 93 are tightened. As such, a bumper or fender that has a shape extending transversely from the brackets 74, is supported by extending the cross brackets 90 the appropriate distance. In other words, the cross brackets 90 extend perpendicularly with respect to the sleeves 68. The cross brackets 90 can also be rotated to position the extensions 92 upwardly or downwardly as desired. It is envisioned that inclusion of the cross brackets 90 may require that the tubular support column 50 and telescopic shaft 30 be provided with longer lengths than when the cross brackets are not provided with the bumper holder 10.

As can be seen from the drawings and the above description, the cradle 14 is expandable into various positions that securely hold a bumper 16 so that the appropriate work may be performed. The structure of the bumper holder 10 provides numerous advantages not present in any known device for holding bumpers. Primarily, the bumper holder 10 provides a device that is easily configured to various sizes and shapes of bumpers, fenders and other work pieces. Additionally, the bumper holder 10 is easily movable between various work stations and is collapsible for easy storage. Use of the bumper holder 10 prevents the bumper from twisting or wobbling while it is being worked upon to ensures quality workmanship. Thus, it will be appreciated that the bumper holder 10 significantly reduces the amount of time required to repair a damaged automobile bumper.

Referring now to FIGS. 3 and 4, an alternative detachable handle for moving the bumper holder 10 is generally designated by the numeral 94. The handle 94 has a grip end 95 opposite an L-bracket 96 which is slidably received in the triangular opening 33. The L-bracket 96 has a handle edge 97 that is connected to the handle 94 opposite a gusset edge 98. As best seen in FIG. 4, the handle 94 is positioned off center with respect to the L-bracket 96 to allow insertion of the gusset edge 98 into the triangular opening 33. It will be appreciated that upon insertion of the handle 94 into the carriage 12, the grip end 95 is lifted up, thus lifting the transverse beam 22 and allowing rotation of the wheels 28. When the handle 94 is set down, it can be removed from the carriage 12 and stored.

Thus, it can be seen that the objects of the invention have been satisfied by the structure presented above. It should be apparent to those skilled in the art that the objects of the present invention could be practiced with any type of automobile bumper or like part having similar structural qualities.

While the preferred embodiment of the invention has been presented and described in detail, it will be understood that the invention is not limited thereto or thereby. Especially in that various materials and configurations may be used in the construction of the invention to meet the various need of the consumer. Accordingly, for an appreciation of the true scope and breadth of the invention, reference should be made to the following claims.

What is claimed is:

1. A collapsible bumper holder, comprising:
    a carriage; and
    a cradle carried by said carriage, said cradle having a first sleeve connected to said carriage and a pair of arms slidably received in said first sleeve and movable between a collapsed storage position and an expanded holding position adaptable to receive a bumper.

2. The collapsible bumper holder according to claim 1, wherein said carriage comprises:
    a base;
    a tubular support column extending upwardly from said base said cradle being positioned within said tubular support column; and
    means for adjusting the position of said cradle within said tubular support column to obtain one of the collapsed storage position and the expanded holding position.

3. The collapsible bumper holder according to claim 2, wherein said cradle further comprises:
    a telescopic shaft slidably received within said tubular support column, said adjusting means selectively holding said telescopic shaft within said tubular support column;
    said first sleeve connected to said telescopic shaft; and
    said pair of arms slidably received within said first sleeve and movable between the collapsed storage position and the expanded holding position.

4. The collapsible bumper holder according to claim 3, wherein said first sleeve comprises:
    a top member;
    a bottom member;
    a pair of opposed sidewalls interconnecting said top member to said bottom member;
    a center wall interconnecting said top member to said bottom member and defining a pair of apertures with each said sidewall, each one of said apertures slidably receiving one of said pair of arms; and
    a holding knob received in each one of said pair of opposed sidewalls to selectively position one of said pair of arms being, said arms withdrawn and reinserted to obtain the collapsed storage position and the expanded holding position.

5. The collapsible bumper holder according to claim 4, further comprising:
    a pair of second sleeves, each of said pair of second sleeves connected to one of said pair of arms, each said pair of second sleeves having a pair of tubes; and
    a bracket slidably received within each said robe, said brackets movable between the collapsed storage position and the expanded holding position.

6. The collapsible bumper holder according to claim 5, further comprising a cushion secured to each of said pair of second sleeves and wherein each of said brackets has an angular extension.

7. The collapsible bumper holder according to claim 6, further comprising a cross bracket transversely extending from at least one of said pair of arms.

8. An apparatus for holding a work piece, comprising:
    a carriage;
    a shaft extending upwardly from said carriage;
    a first sleeve connected to said shaft;
    a pair of arms slidably received within said first sleeve; and
    means for adjusting the position of each said pair of arms within said first sleeve, said pair of arms movable to hold various sizes of work pieces.

9. The apparatus for holding a work piece according to claim 8, further comprising:
    a pair of second sleeves connected to each one of said pair of arms;
    a pair of brackets slidably received within each said pair of second sleeves; and
    means for positioning said pair of brackets within each said pair of second sleeves to hold various sizes of work pieces.

10. The apparatus for holding a work piece according to claim 9, further comprising:
    a tubular support column connected to said carriage, said tubular support column having an adjustment knob and slidably receiving said shaft, wherein said adjustment knob selectively positions said shaft within said tubular support column.

11. The apparatus for holding a work piece according to claim 10, further comprising:
    an axle connected to said carriage;
    a pair of wheels connected to each end of said axle; and
    a handle detachably mounted to said carriage, said handle allowing the tilting of said carriage onto said pair of wheels to allow transport of the apparatus.

12. The apparatus for holding a work piece according to claim 11, further comprising a plate connected to said carriage and said shaft, wherein said handle is connected to said plate by a pivot pin, said pivot pin allowing said handle to be moved between a storage position and a moving position.

13. The apparatus for holding a work piece according to claim 11, further comprising a gusset connected to said carriage and said shaft and forming a triangular opening, said handle having an L-bracket that is slidably received within said triangular opening to allow tilting of the carriage onto said pair of wheels to allow transport of the apparatus.

14. The apparatus for holding a work piece according to claim 10, further comprising a cross bracket, wherein each said, pair of arms has a bracket aperture to slidably receive said cross bracket.

15. A bumper holder, comprising:
    a carriage having a base, a tubular support column extending upwardly from said base, and an adjustment knob connected to said tubular support column; and a cradle having a telescopic shaft slidably received within said tubular support column and positionally secured therein by said adjustment knob, a sleeve connected to said telescopic shaft and slidably receiving a pair of arms which are positionally secured therein by a pair of arm adjustment knobs, said pair of arms movable to hold a bumper in a desired position.

16. The bumper holder according to claim 15, wherein said sleeve comprises:

a top member;

a bottom member;

a pair of opposed sidewalls interconnecting said top member to said bottom member; and a center wall interconnecting said top member to said bottom member and defining a pair of apertures with each said sidewall, each one of said pair of arms indexable within one of said apertures.

17. The bumper holder according to claim 16, further comprising:

a second sleeve attached to each one of said pair of arms, said second sleeve slidably receiving therein a pair of brackets for holding the bumper;

a pair of wing nuts for positionally adjusting each one of said pair of brackets within said second sleeve; and a cushion secured to each said second sleeve.

18. The bumper holder according to claim 17, wherein said pair of arms are indexable within said sleeve between a first position, wherein said second sleeves are in a substantially parallel relationship with said tubular support column, and a second position wherein said second sleeves are in a substantially perpendicular relationship with said tubular support column.

19. The bumper holder according to claim 18, wherein each said pair of arms has a bracket aperture that slidably receives a cross bracket and a bracket adjustment knob to hold said cross bracket in a desired position.

\* \* \* \* \*